US006524473B2

(12) United States Patent
Williamson

(10) Patent No.: US 6,524,473 B2
(45) Date of Patent: Feb. 25, 2003

(54) GRAVITATIONAL SEPARATOR AND DRAINWATER TREATMENT SYSTEM FOR USE IN A HORIZONTAL PASSAGEWAY

(75) Inventor: J. Kelly Williamson, 6104 St. Andrews Way, Hixson, TN (US) 37343

(73) Assignee: J. Kelly Williamson, Hixon, TN (US)

( * ) Notice: Subject to any disclaimer, the term of this patent is extended or adjusted under 35 U.S.C. 154(b) by 0 days.

(21) Appl. No.: 09/785,621

(22) Filed: Feb. 16, 2001

(65) Prior Publication Data

US 2001/0013489 A1 Aug. 16, 2001

Related U.S. Application Data

(63) Continuation-in-part of application No. 09/441,307, filed on Nov. 16, 1999, now Pat. No. 6,190,545, which is a continuation-in-part of application No. 09/053,431, filed on Apr. 1, 1998, now abandoned.

(51) Int. Cl.[7] .............................................. B01D 21/26
(52) U.S. Cl. ..................... 210/154; 210/170; 210/304; 210/305; 210/512.1; 210/519; 210/532.1; 210/265
(58) Field of Search ................................. 210/153, 154, 210/170, 163, 259, 265, 299, 304, 305, 512.1, 519, 521, 532.1

(56) References Cited

U.S. PATENT DOCUMENTS

| | | | | |
|---|---|---|---|---|
| 1,651,246 A | * | 11/1927 | Bell | 210/512.1 |
| 2,068,140 A | * | 1/1937 | Jaquith | 210/512.1 |
| 4,906,381 A | | 3/1990 | Barbaro | |
| 4,985,148 A | * | 1/1991 | Monteith | 210/519 |
| 5,223,154 A | | 6/1993 | MacPherson, Jr. et al. | |
| 5,427,679 A | * | 6/1995 | Daniels | 210/170 |
| 5,498,331 A | * | 3/1996 | Monteith | 210/532.1 |
| 5,507,944 A | | 4/1996 | Freidland et al. | |
| 5,511,904 A | | 4/1996 | Van Egmond | |
| 5,759,415 A | * | 6/1998 | Adams | 210/519 |
| 5,788,849 A | | 8/1998 | Hutter, Jr. et al. | |
| 5,820,762 A | | 10/1998 | Bamer et al. | |
| 6,077,448 A | * | 6/2000 | Trun-Quoi-Num et al. | 210/519 |
| 6,120,684 A | * | 9/2000 | Kistner et al. | 210/532.1 |
| 6,177,004 B1 | * | 1/2001 | Bracone, Jr. | 210/265 |

OTHER PUBLICATIONS

Ad. literature—"Hydro–Kleen Filter Systems", Bamcon Engineering Inc., Castro Valley, CA.
Ad. literature—Unit "H", Suntree Isles, Inc., Cape Canaveral, FL.

* cited by examiner

Primary Examiner—Christopher Upton
(74) Attorney, Agent, or Firm—Michael E. McKee

(57) ABSTRACT

A hydrodynamic gravitational separator and an attending drainwater filtration section positionable within a horizontal flow passage of a drainage system utilizes a circular-walled collection cavity into which drainwater is directed so that a swirling motion is imparted to the drainwater collected within the collection cavity. Furthermore, a baffle plate is supported within the collection cavity adjacent the exit opening thereof to isolate the exit opening from the swirling motion of the drainwater collected within the cavity. The filtration section includes a filter disposed downstream of the exit opening of the collection cavity so that drainwater which exits the collection cavity is subsequently routed through the filter.

16 Claims, 3 Drawing Sheets

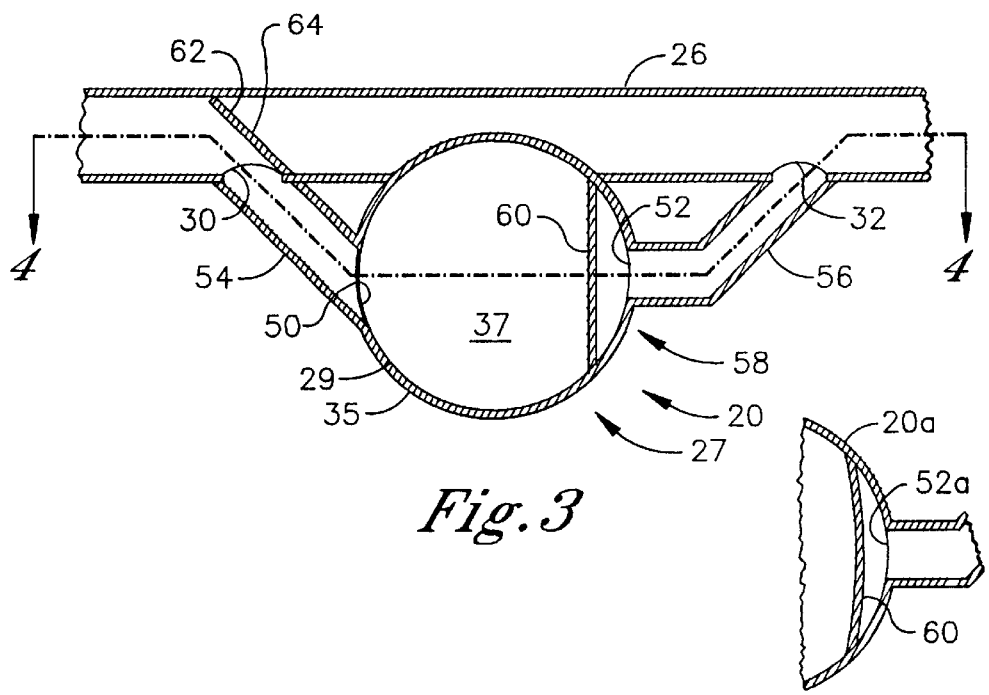
Fig. 3
Fig. 7
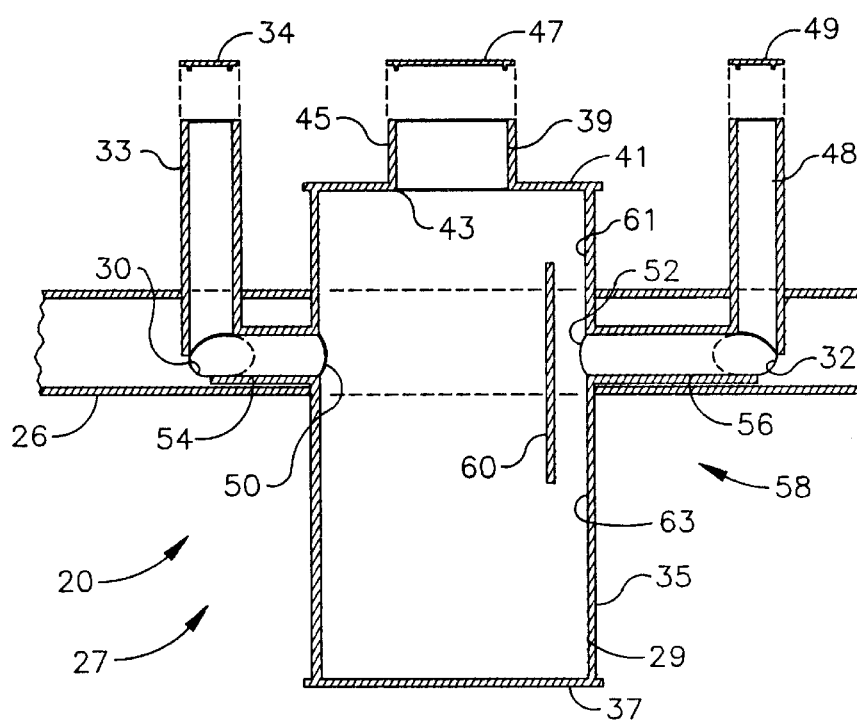
Fig. 4

GRAVITATIONAL SEPARATOR AND DRAINWATER TREATMENT SYSTEM FOR USE IN A HORIZONTAL PASSAGEWAY

This application is a continuation-in-part of application Ser. No. 09/441,307 filed Nov. 16, 1999, now U.S. Pat. No. 6,190,545 which is a continuation-in-part of application Ser. No. 09/053,431 filed Apr. 1, 1998, now abandoned, and the disclosures of these applications are incorporated herein by reference.

BACKGROUND OF THE INVENTION

This invention relates generally to the treatment of drainwater which passes into the piping of a drainage system by way of a storm drain and relates, more particularly, to catch basins or other gravitational separators into which drainwater is routed and filtration systems through which drainwater is routed for the purposes of filtering contaminants from the drainwater.

It is known that residue from oil and gasoline spills at service stations, parking lots or similar sites commonly remains at the site of the spill until it is washed away with water by way of a rainfall or a hose-cleaning operation. of, course, as the residue and/or spilled material is washed to a drain, it is likely to be carried to and mixed with the water supply (e.g. lakes, etc.) from which drinkable water is taken. Similar problems and environmental concerns arise at alternative sites, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites. It would be desirable to provide means for separating unwanted contaminants from drainwater which is washed into a drainage system.

It is an object of the present invention to provide a new and improved gravitational separator into which drainwater is routed when conducted along a drainage system.

Another object of the present invention is to provide such a separator which is easily serviceable and is particularly well-suited for use with a filtration system through which drainwater which enters a storm drain is directed for the purpose of filtering the drainwater.

Still another object of the present invention is to provide a new and improved drainwater treatment system which is positionable within a horizontal flow passage of a storm drain system and which provides an improvement upon the structure and filtration capabilities of the drainwater treatment systems of the prior art.

Yet another object of the present invention is to provide such a treatment system which provides a relatively high exposure of drainwater to filter medium as drainwater flows through the treatment system.

A further object of the present invention is to provide such a system which is uncomplicated in construction and effective in operation.

SUMMARY OF THE INVENTION

This invention resides in a gravitational separator positionable within a drainage system having an upstream pipe portion having an outlet through which drainwater enters the separator and a downstream pipe portion having an inlet through which drainwater exits the separator.

The treatment system includes means for defining a flow cavity having a bottom and a substantially circular sidewalls extending upwardly from the bottom. The sidewalls include an entrance opening which is connectable in flow communication with the outlet of the upstream pipe portion and an exit opening which is connectable in flow communication with the inlet end of the downstream pipe portion. Furthermore, the entrance and exit openings are disposed in an elevated and spaced condition above the bottom of the cavity-defining means.

In addition, the cavity-defining means is positionable in such a relation to the upstream pipe portion so that drainwater which enters the cavity-defining means through the entrance opening thereof is directed substantially tangentially along the inside surface of the sidewalls to impart a swirling motion to drainwater collected within the cavity-defining means. The separator further includes baffle means supported within the cavity-defining means and adjacent the exit opening of the cavity-defining means for isolating the exit opening from swirling motion of drainwater collected within the cavity-defining means yet permit drainwater to exit the cavity-defining means through the exit opening when the level of drainwater collected within the cavity-defining means reaches the level of the exit opening.

In one aspect of the present invention, the separator is used in conjunction with a drainwater filtration system disposed downstream of the exit opening of the cavity-defining means so that drainwater which exits the cavity-defining means is subsequently routed through the filtration system.

BRIEF DESCRIPTION OF THE DRAWINGS

FIG. 3 is a cross-sectional view of the FIG. 1 separator taken about along line 3—3 of FIG. 2.

FIG. 4 is a cross-sectional view taken about along line 4—4 of FIG. 3.

FIG. 7 is a cross-sectional view, similar to that of FIG. 3, of a fragment of an alternative separator which employs a baffle plate of arcuate shape.

DETAILED DESCRIPTION OF THE ILLUSTRATED EMBODIMENTS

Figure 1:
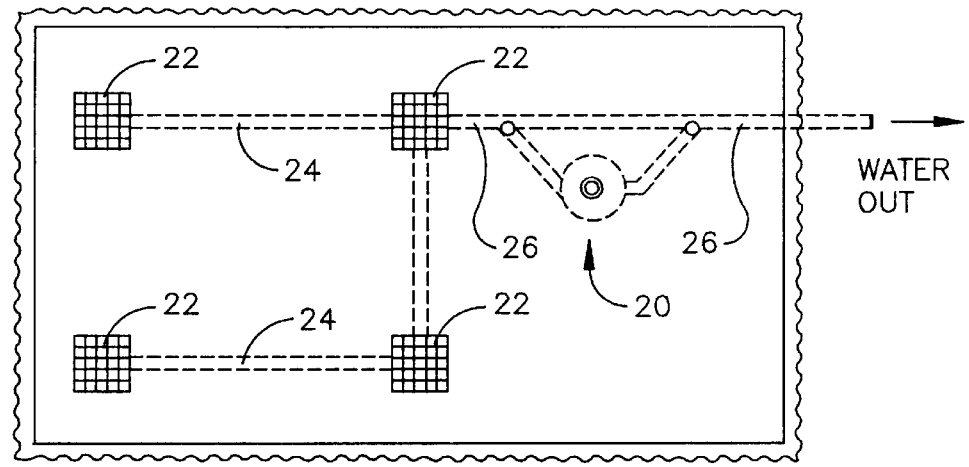
FIG. 1 is a plan view of an environment within which an embodiment of a gravitational separator is employed.
Figure 2:
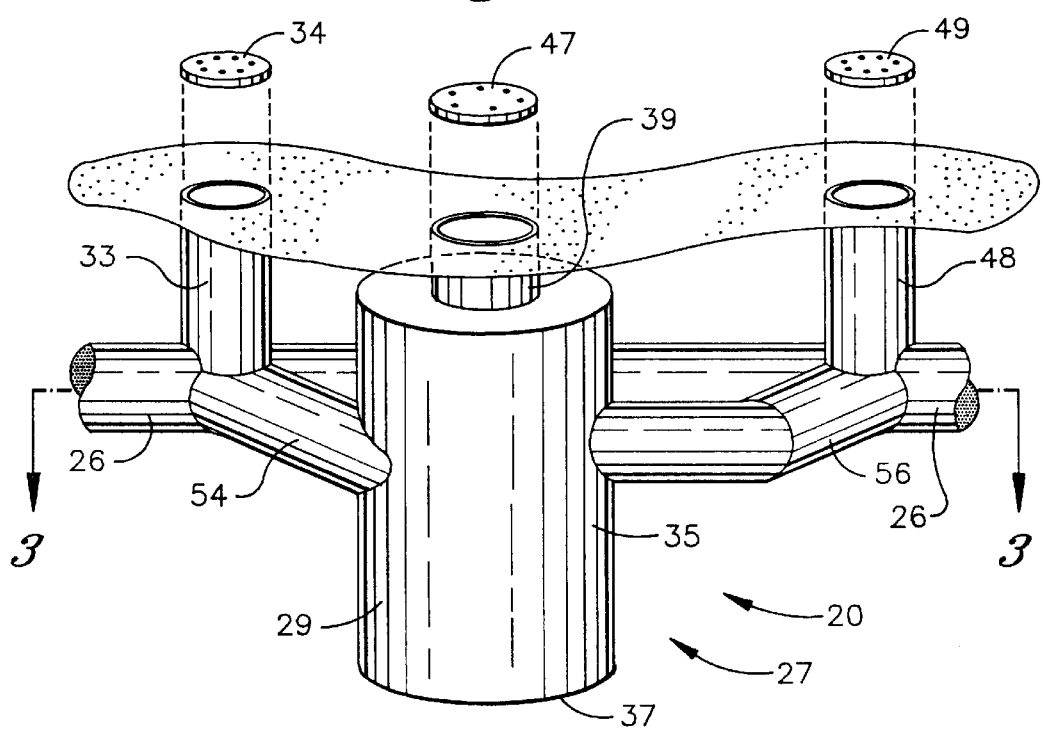
FIG. 2 is a perspective view of the FIG. 1 separator.

Turning now to the drawings in greater detail and considering first FIGS. 1–4, there is illustrated an embodiment, generally indicated 20, of a hydrodynamic gravitational separator within which features of the present invention are embodied. The depicted separator 20 is designed for use in an application, such as depicted in plan view in FIG. 1, wherein several surface drains 22, 22 are connected with appropriate (underground) drain piping 24 to accommodate the flow of drainwater from the several surface drains 22, 22 toward a single discharge point. The drain piping 24 includes a single, substantially horizontally-oriented convergence drain pipe 26 through which the drainwater flows from each of the surface drains 22, 22, and the separator embodiment 20 is installed in this drain pipe 26. As will be apparent herein, the separator 20 provides a highly effective means for the removal of sediment and free-floating oil and debris contained within the drainwater.

With reference to FIGS. 1–4, the horizontally-oriented drain pipe 26 is opened at two locations along its length, and the separator 20 includes means, generally indicated 27, for defining a flow, or collection, cavity 29 through which drainwater is permitted to flow is connected in flow communication with the drain pipe 26 by way of the opened locations. In this connection, a first opening 30 is formed in a side of the drain pipe 26 at one location, a second opening 32 is formed in a side of the drain pipe 26 downstream of the first location 30, and the flow cavity 29 is connected between the openings 30 and 32 with suitable piping, described herein, so that a substantial portion of the flow of drainwater through the drain pipe 26 is routed through the cavity-defining means 27. In other words, the cavity-defining means 27 is connected in such a flow relationship to the drain pipe 26 so that a substantial portion of the drainwater which flows along the drain pipe 26 is routed to the cavity-defining means 27 by way of the first opening 30 and is returned to the drain pipe 26 from the cavity-defining means 27 by way of the second opening 32.

For the purpose of directing a substantial portion of the drainwater which flows along the drain pipe 26 through the first opening 30 and toward the separator 20, a diversion weir 62 (FIG. 3) is mounted within the drain pipe 26 adjacent, and slightly downstream of, the first opening 30. The depicted diversion weir 62 is in the form of a plate 64 which spans the lower portion of the passageway provided by the drain pipe 26 yet permits drainwater to pass across (the upper edge of) the weir 62 in the event of peak flow (e.g. storm) conditions. Therefore, in situations which are less than peak flow conditions, almost all of the drainwater is directed from the drain pipe 26 and toward the separator 20 by way of the first opening 30. It has been found that the diversion weir 62 directs between about eighty-five and ninety-five percent of the annual runoff volume flowing through the drain pipe 26 toward the separator 20. Larger, less frequent storm events are routed over the weir 62, thus by-passing the separator 20 thereby reducing turbulence within the cavity-defining means 27 and lessening the possibility that pollutants which have been previously captured within the separator 20 will become re-suspended within the drainwater.

Although the cavity-defining means 27 of the separator 20 can be constructed of a number of materials, such as steel or concrete, providing circular sidewalls 35 and a bottom 37, the depicted separator 20 is fabricated of durable high-density polyethylene (HDPE) materials which promotes a long, useful life of the separator 20. The HDPE materials comprising the separator 20 are relatively light in weight, unlike concrete, so that the separator 20 can normally be off-loaded at a jobsite without the need for special lifting equipment, such as a crane, thereby accommodating easy on-site handling and installation.

As best shown in FIG. 4, the sidewalls 35 extend upwardly from the bottom 37 to an upper (manway) portion 39 of reduced diameter. This upper portion 39 includes a top, or plate section 41, having a central opening 43 formed therein and a circular neck 45 which is sealingly joined, as with welds (e.g. butt-fusion welds) or other suitable bonding techniques, along its bottom edges to the plate section 41 about the central opening 43. The peripheral edges of the plate section 41 are, in turn, sealingly joined to the upper edges of the sidewalls 35. It follows that in the depicted separator 20, the plate section 41 and the neck 45 are also constructed of the aforementioned HDPE material. When the cavity-defining means 27 is connected to the drain pipe 26 for operation, the cavity-defining means 27 lies buried beneath the surface of the ground yet is accessible through the opening of the neck 45. Until access to the interior of the cavity-defining means 27 is required, the opening of the neck 45 can be covered by a manhole cover 47.

It is a feature of the separator 20 that its cavity-defining means 27 includes an entrance opening 50 which is connectable to the drain pipe 26 by way of the first opening 30 and an exit opening 52 which is connectable to the drain pipe 26 by way of the second opening 30. To effect these connections, there is provided an upstream pipe segment 54 which is sealingly joined between the first opening 30 and the entrance opening 50 and a downstream pipe segment 56 which is sealingly joined between the exit opening 52 and the second opening 30. Furthermore, the entrance and exit openings 50 and 52 are disposed in an elevated and spaced condition above the bottom 37 of the cavity-defining means 27 to provide the flow cavity 29 with a collection area of substantial size into which debris and large sediment is permitted to fall and collect from the drainwater which enters the cavity-defining means 27. Moreover, the entrance and exit openings 50 and 52 are disposed at about the same elevation, or level, and on opposite sides of the cavity-defining means 27, but other relative dispositions between the entrance and exit openings 50 and 52 can be had. In order that drainwater be permitted to flow freely through the cavity-defining means 27 (and thus prevent a backlog of drainwater at the cavity-defining means 27), it is preferable that the exit opening 52 be disposed at an elevation which is no higher than that of the entrance opening 52. To provide access to the interior of the upstream pipe segment 54 for purposes of inspection and/or clean-out, a manway conduit 33 is joined to the upstream pipe segment 54 adjacent its intersection with the drain pipe 26 so as to extend upwardly therefrom, and a manhole cover 34 is positioned across so as to cover the mouth of the manway conduit 33. Similarly and to provide access to the interior of the downstream pipe segment 56 for purposes of inspection and/or clean-out, a manway conduit 48 is joined to the downstream pipe segment 56 adjacent its intersection with the drain pipe 26 so as to extend upwardly therefrom, and a manhole cover 49 is positioned across so as to cover the mouth of the manway conduit 48.

It is also a feature of the separator 20 that the upstream pipe segment 54 is disposed in such a relation to the cavity-defining means 27 so that drainwater which enters the cavity-defining means 27 through the entrance opening 50 is directed substantially tangentially along the inside surface of the sidewalls 35 to impart a swirling, or circular, motion to drainwater entering the opening 50 and collected within the cavity-defining means 27. To this end, the upstream pipe segment 54 is joined to the entrance opening 50 of the cavity-defining means 27 so that the longitudinal axis of the pipe segment 54 is canted with respect to the surface of the sidewall 35 within which the entrance opening 50 is defined. More specifically, the pipe segment 54 is joined to the sidewalls 37 so that the pipe segment 54 is arranged substantially tangentially of the circular shape of the sidewalls 35 so that, as mentioned above, the drainwater which enters the cavity-defining means 27 through the entrance opening 50 is directed substantially tangentially along the inside surface of the sidewalls 35.

It is a further feature of the separator 20 that it includes baffle means, generally indicated 58, disposed within the interior of the cavity-providing means 27 and adjacent the exit opening 52 which, among other things, serves to isolate the exit opening 52 from the swirling motion of the drainwater within the cavity-defining means 27 yet permit drainwater to exit the cavity-defining means 27 when the level of the drainwater collected within the cavity-defining means reaches the elevation, or level, of the exit opening 52. In the depicted embodiment 20, the baffle means 58 is in the form of a flat, rectangularly-shaped plate 60 having two opposite (side) edges which are sealingly joined to the interior surface of the sidewalls 35 at locations disposed on opposite (laterally-disposed) sides of the exit opening 52. The plate 60 is thus spaced from yet covers the mouth of the exit opening 52 so that the only drainwater which is permitted to enter the exit opening enters either the spacing, indicated 61 in FIG. 4, provided between the upper edge of the plate 60 and the sidewalls 35 or the spacing, indicated 35, provided between the lower edge of the plate 60 and the sidewalls 35. Since the plate 60 is spaced in relatively close proximity to the mouth of the exit opening 52 (e.g. preferably no more than about four inches from the exit opening 52), large pieces of debris are prevented from entering the exit opening 52 of the cavity-defining means 27 and are therefore retained within the interior of the cavity-defining means 26.

During operation, drainwater enters the cavity 29 of the separator 20 by way of the upstream pipe segment 54 and entrance opening 50 so that a swirling, or circular, flow pattern is induced within the drainwater collected within the cavity 29 by virtue of the tangential flow of drainwater entering the cavity 29 along the inside surface of the sidewalls 35. A combination of gravitational and drag forces encourage the solids to drop out of the flow and migrate to the center of the cavity 29 where flow velocities are at their lowest. The velocity gradient that has been created by the swirling action of the water prevents solids from re-suspending, even under high flow conditions. The treated drainwater flow is permitted to exit the cavity 29 of the separator 20 when the level of the drainwater collected within the separator 20 reaches the elevation of the mouth of the exit opening 52. Meanwhile, the plate 60 of the baffle means 58, whose bottom edge extends an appreciable distance (e.g. eighteen inches) beneath the elevation of the mouth of the exit opening 52, prevents the egress of free-floating oil and debris (or other floatable liquids and solids) through the exit opening 52 so that such oil and debris are retained within the cavity 29 for collection and subsequent removal. Furthermore, the upper edge of the plate 60 extends above the elevation of the mouth of the exit opening 52, thereby normally exposing the spacing 61 (FIG. 4) to atmospheric conditions so that a siphon is prevented from forming at the exit opening 52 and serves as an emergency overflow feature. Cleanout of the separator 20 is effected through the neck 45 of the upper portion 39 upon accumulation of a sufficient amount of debris or floatable liquids within the separator cavity 29.

Exemplary dimensions of a separator 20 are as follows: The diameter of the cavity 29 of the separator 20 is about fifty-four inches; each of the entrance and exit openings 50 and 52 are disposed about 54.5 inches from the bottom 37 of the separator 20; the total height of the sidewalls 35 is about 91.5 inches; the diameter of the neck 45 is about twenty-four inches; the height of the plate 60 of the baffle means 58 is about thirty-eight inches; and the distance between the lower edge of the plate 60 and the bottom 37 is about thirty-six inches. A separator 20 with the aforestated dimensions provides a sediment storage capacity of 1.25 cubic yards and is capable of capturing 125 gallons of petroleum hydrocarbons. Furthermore, the separator has a hydraulic capacity of nine cubic feet per second (cfs) and a treatment capacity of 2.6 cfs.

Figure 5:
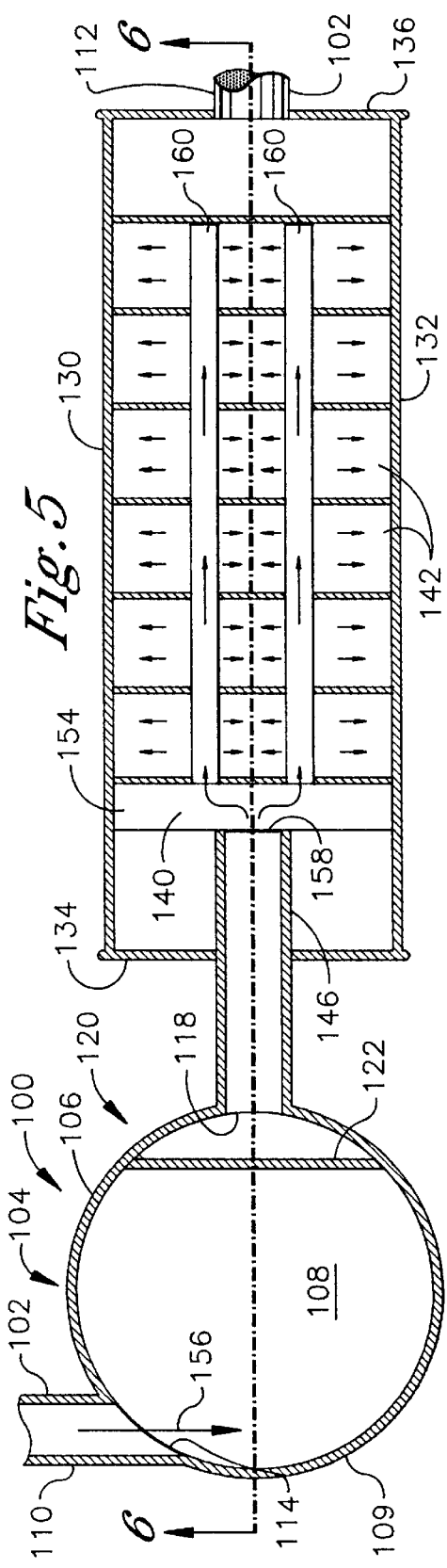
FIG. 5 is a cross-sectional view, similar to that of FIG. 3, of another embodiment of a separator shown utilized in conjunction with a drainwater filtration system.
Figure 6:
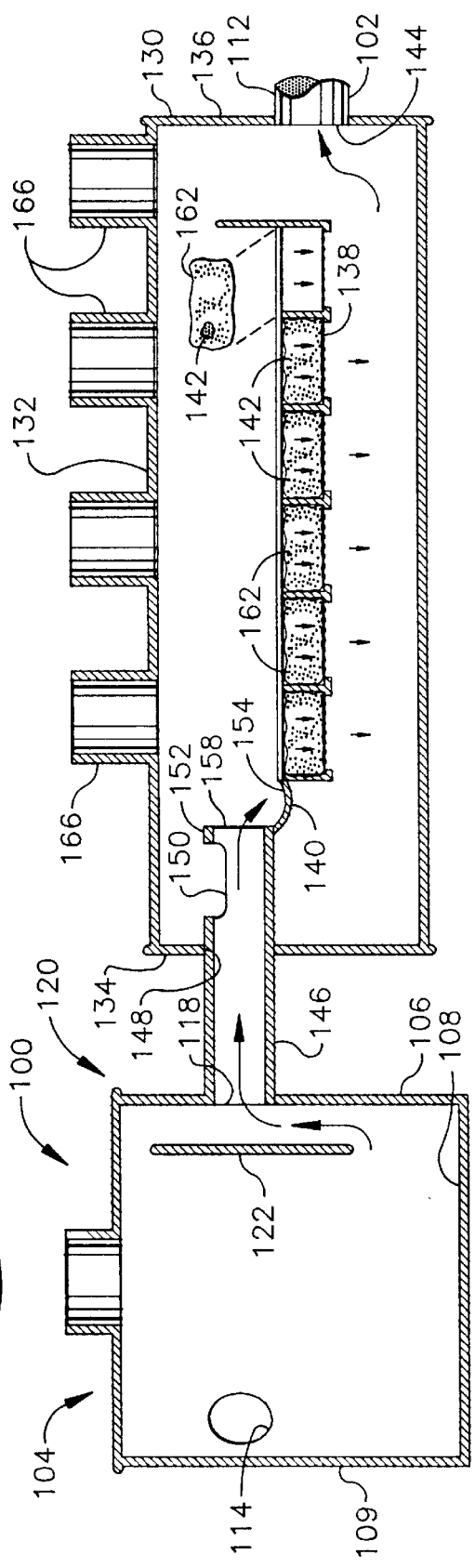
FIG. 6 is a cross-sectional view taken about along line 6—6 of FIG. 5, but showing one bag of filter medium in a raised condition above the filter-supporting frame.

Although the aforedescribed separator 20 of FIGS. 1–4 has been shown and described as being connected in such a flow relationship with a horizontal drain pipe 26 of a drainage system so that means, such as a diversion weir 62, is utilized to divert the flow of drainwater from the drain pipe 26 into the separator 20, a separator in accordance with the broader aspects of the invention can be connected in a series, or in-line, flow relationship with a horizontal drain pipe so that none of the drainwater which flows through the drain pipe can bypass the separator. For example, there is illustrated in FIGS. 5 and 6 a separator 100 which is connected in-line with a drain pipe 102 so that all of the water which flows through the drain pipe 102 (even in peak, or heavy, storm conditions) must pass through the separator 100. In this connection, the separator 100 includes a cavity-defining means 104 having circular sidewalls 106 which extend upwardly from a bottom 108 to provide a collection cavity 109, and the drain pipe 102 is separated so as to provide an upstream pipe portion 110 and a downstream pipe portion 112 between which the separator 100 is connected. A sidewall 106 of the separator 100 has an entrance opening 114 to which the upstream pipe portion 110 is sealingly connected, and the upstream pipe portion 110 is disposed in such a relationship to the entrance opening 114 that the drainwater which enters the cavity 109 of the cavity-defining means 104 is directed substantially tangentially along the inside surface of the sidewalls 106 (e.g. in the direction indicated by the flow arrow 156) to impart a swirling motion to the drainwater collected within the cavity 109.

A sidewall 106 of the separator 100 also includes an exit opening 118 through which drainwater is permitted to exit the interior of the cavity 109 when the level of the drainwater rises within the cavity-defining means 104 to the elevation of the exit opening 118. In addition and as is the case with the separator 20 of FIGS. 1–4, the separator 100 of FIGS. 5 and 6 includes baffle means 120 in the form of a plate 122 supported within the interior of the cavity-defining means 104 in a position adjacent the mouth of the exit opening 118. The plate 122 serves the purpose of isolating the exit opening 118 from the swirling motion of the cavity-defining means 102 and preventing floating liquids and solids from flowing into the mouth of the exit opening 118.

Interposed between the exit opening 118 of the separator 100 and the downstream pipe portion 112 is a drainwater treatment section 130 within which the drainwater is routed for purposes of filtering the drainwater which exits the separator 100. In this connection, the treatment section 130 includes a box-like filtration chamber 132 having an entrance end 134 through which the drainwater enters the section 130 and an exit end 136 through which drainwater exits the section 130. Access to the interior of the chamber 132 can be had through the manway conduits 166 associated with the top of the chamber 132. A filter-supporting frame 138 is affixed across the interior of the chamber 132 in an elevated condition therein, and a network 140 of conduits is associated with the filter-supporting frame 138 for directing drainwater which enters the section 130 over the top of filter medium 142, described herein, supported within the frame. Once directed over the filter medium 142, the drainwater gravitationally flows downwardly therethrough and toward the floor of the chamber 132. upon reaching the elevation of an exit opening 144 provided in the exit end 136 of the chamber 132, the drainwater is permitted to exit the chamber 132 and continue its course along the drain pipe 102.

For delivery of drainwater from the separator 100 and the chamber 132, there is provided an intermediate pipe segment 146 which is joined at one end to the outer wall of the separator 100 about the exit opening 118 provided therein and which has an opposite end portion which protrudes through an opening 148 provided in the entrance end 134 of the chamber 132 toward the filter-supporting frame 138. This protruding end portion has an opening 158 in the end thereof which permits drainwater to flow into the conduit network 140 for distribution over the filter medium 142 and also includes an upper opening 150 (FIG. 6) in the upper side thereof adjacent the pipe segment end 152. In peak (e.g. storm) flow conditions, the upper opening 150 provides a bypass route which permits the drainwater to bypass the filter medium 142 by flowing over the sides of the pipe segment 146 toward the bottom of the chamber 132 and then flowing toward the exit opening 144.

As best shown in FIG. 5, the conduit network 140 includes a main trough-like conduit 154 into which drainwater is permitted to flow from the end 158 of the protruding portion of the pipe segment 146 and a pair of secondary trough-like conduits 160 which are joined at one end of the main conduit 154 for accepting drainwater which flows therein from the main conduit 154. The secondary trough-like conduits 160 are arranged in parallel relationship with one another, and drainwater which exits these conduits 160 flows over the side edges thereof onto the filter medium 142. Along these lines, the secondary conduits 160 extend along paths through the filter medium 142 so that drainwater which flows over the side edges of the secondary conduits 160 is distributed relatively evenly over the top of the filter medium 142.

The filter medium 142 of the depicted embodiment is comprised of a plurality of filters wherein the filter medium is contained within relatively flexible porous outer bags 164 (FIG. 6). In other words, the filter medium 142 is contained within a plurality of filter bags 164. Preferably, the bags 164 resist degradation upon exposure to water to facilitate the change-out of the filter medium, when necessary. Furthermore, the bags 164 of filters are collectively sized to completely cover the filter-supporting frame 138 when positioned therein so that drainwater which flows onto the filter-supporting frame 138 by way of the pipe segment 146 must flow through the filter bags 164 on its way to the floor of the chamber 132.

A filter medium 142 which is well-suited for use in the filters 162 is a hydrophobic material which repels water and which has been found to suitably absorb oil and grease, TSS, barium, chromium, and lead from drainwater routed through the treatment section 130. Basically, the filter material utilizes the natural capillary action of cellulose fiber to draw unwanted contaminants into the interior of the fiber. It will be understood, however, that the filter medium which is ultimately used in the treatment section 130 can be selected based upon the contaminant desired to be filtered from the drainwater.

It follows that as drainwater enters the separator 160 by way of the upstream pipe portion 110 of the drain pipe 102 flows into the collection cavity 109 where its flow is decelerated and debris and suspended solids are permitted to settle onto the bottom 108 of the collection cavity 109 before entering the treatment section 130 where the drainwater flows through the filters 162 before exiting the treatment section 130 by way of the downstream portion 112 of the drain pipe 102.

It follows from the foregoing that a hydrodynamic gravitational separator and an associated drainwater treatment, e.g. filter, system has been described which provides a highly effective and economical means of pollution prevention by removing hazardous wastes and other regulated pollutants from stormwater runoff and wastewater discharges. Contaminated water enters the separator where its flow is decelerated to near-still conditions, and the contaminants of concern are thereafter extracted in a filtering process using reclaimed materials. Moreover, the system is easily serviceable in that its filters can be readily installed or replaced when necessary through appropriate manway openings.

It will be understood that numerous modifications and substitutions can be had to the aforedescribed embodiments without departing from the spirit of the invention. For example, although the baffle means 58 of the separator embodiment 20 has been shown and described as being in the form of a flat plate 60, the baffle means 58 can take an alternative form. For example, there is shown in FIG. 7 an alternative embodiment of a separator 20a having a baffle means 58a in the form of an arcuate plate 60a having opposite (side) edges which are sealingly joined to the interior surface of the sidewalls 35a at locations disposed on opposite (laterally-disposed) sides of the exit opening 52a. The concave side of the depicted arcuate plate 60a is directed inwardly (i.e. toward the center) of the cavity of the separator 20a so that the side edges of the plate 60a provide a smooth transition for the flow of drainwater as it travels along the circular sidewalls and onto the arcuate plate 60a. Therefore and in order to promote a smoother, or less interrupted, swirling motion of the drainwater within the cavity of the separator 20a as the drainwater flows therein, the arcuate baffle plate 60a may be preferable over the flat plate 60 of the FIGS. 1–4 embodiment 20.

Further still and although the aforedescribed embodiments have been described for installation within storm drain systems having cavities and convergence pipes, an embodiment in accordance with the broader aspects of the invention can be designed for installation within alternative site-specific applications, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites. Accordingly, the aforedescribed embodiments are intended for the purpose of illustration and not as limitation.

What is claimed is:

1. A gravitational separator positionable within a drainage system having an upstream pipe portion having an outlet through which drainwater enters the separator and a downstream pipe portion having an inlet through which drainwater exits the separator, the gravitational separator comprising:

means for defining a collection cavity having substantially circular sidewalls, a bottom, an entrance opening through which drainwater enters the collection cavity from the upstream pipe portion, and an exit opening through which drainwater exits the collection cavity and which is connectable to the downstream pipe portion, and wherein the entrance and exit openings are disposed in an elevated and spaced condition above the bottom;

the collection cavity-defining means being connectable to the upstream pipe portion at such an angle with respect thereto so that drainwater which enters the collection cavity through the entrance opening thereof is directed by the upstream pipe portion substantially tangentially along the inside surface of the sidewalls to impart a swirling motion to drainwater collected within the collection cavity of the cavity-defining means; and baffle means supported within the collection cavity of the cavity-defining means and adjacent the exit opening of the cavity-defining means for isolating the exit opening from swirling motion of the drainwater within the collection cavity of the cavity-defining means yet permit drainwater to exit the cavity-defining means through the exit opening when the level of drainwater collected within the cavity-defining means reaches the level of the exit opening.

2. The separator as defined in claim 1 wherein the exit opening has a mouth and the baffle means includes a plate which is joined to the sidewalls of the cavity-defining means at locations situated on opposing sides of the exit opening so that the plate spans the mouth of the exit opening.

3. The separator as defined in claim 2 wherein the plate of the baffle means is joined to the sidewalls so as to be in relatively close proximity to the mouth of the exit opening.

4. The separator as defined in claim 3 wherein the plate is spaced from the mouth of the exit opening by no more than about 4.0 inches.

5. The separator as defined in claim 2 wherein the plate of the baffle means is flat in shape.

6. The separator as defined in claim 2 wherein the plate of the baffle means is arcuate in shape.

7. The separator as defined in claim 1 wherein the diameter of the cavity-defining means is between about 50 and 60 inches, and each of the entrance and exit openings are spaced from the bottom of the cavity-defining means by at least about 50 inches.

8. The separator as defined in claim 1 wherein the exit opening is spaced from the bottom of the cavity-defining means by a distance which is no greater than the distance that the entrance opening is spaced from the bottom of the cavity-defining means.

9. The separator as defined in claim 1 in combination with a drainwater filtration system disposed downstream of the exit opening of the cavity-defining means so that drainwater which exits the cavity-defining means is subsequently routed through the filtration system.

10. A drainwater treatment system positionable within a drainage system having an upstream pipe portion having an outlet through which drainwater enters the system and a downstream pipe portion having an inlet through which drainwater exits the system, the treatment system comprising:

a gravitational separator including
a) means for defining a collection cavity having substantially circular sidewalls, a bottom, an entrance opening through which drainwater enters the collection cavity from the upstream pipe portion, and an exit opening through which drainwater exits the collection cavity and which is connectable to the downstream pipe portion, and wherein the entrance and exit openings are disposed in an elevated and spaced condition above the bottom;
b) the collection cavity-defining means being connectable to the upstream pipe portion at such an angle with respect thereto so that drainwater which enters the collection cavity through the entrance opening thereof is directed by the upstream pipe portion substantially tangentially along the inside surface of the sidewalls to impart a swirling motion to drainwater collected within the collection cavity of the cavity-defining means; and
c) baffle means supported within the collection cavity of the cavity-defining means and adjacent the exit opening of the cavity-defining means for isolating the exit opening from swirling motion of the drainwater within the collection cavity of the cavity-defining means yet permit drainwater to exit the cavity-defining means through the exit opening when the level of drainwater collected within the cavity-defining means reaches the level of the exit opening; and
a filter disposed downstream of the exit opening of the cavity-defining means so that drainwater which exits the cavity-defining means is subsequently routed through the filter.

11. The system as defined in claim 10 further comprising a downstream chamber which is situated downstream of the cavity-defining means so that drainwater which exits the cavity-defining means is subsequently routed through the downstream chamber, and the filter is supported within the downstream chamber so that drainwater which enters the downstream chamber is directed through the filter.

12. The system as defined in claim 11 wherein the downstream chamber includes a floor and an entrance opening into which the drainwater enters the downstream chamber from the cavity-defining means, the entrance opening of the downstream chamber is spaced above the floor thereof, and the filter is bodily supported above the floor of the downstream section so that drainwater which is directed through the filter is gravitationally directed downwardly therethrough toward the floor of the downstream chamber.

13. The system as defined in claim 12 wherein the downstream chamber includes an exit opening through which drainwater is permitted to exit the downstream chamber.

14. The system as defined in claim 13 wherein the exit of the downstream chamber is spaced above the floor of the downstream chamber so that drainwater is permitted to exit the downstream chamber when the level of the drainwater which is collected within the downstream chamber reaches the level of the exit opening thereof.

15. The system as defined in claim 10 wherein the filter includes a hydrophobic material.

16. A gravitational separator positionable within a drainage system having an upstream pipe portion having an outlet through which drainwater enters the separator and a downstream pipe portion having an inlet through which drainwater exits the separator, the gravitational separator comprising:

means for defining a collection cavity having substantially circular sidewalls, a bottom, an entrance opening through which drainwater enters the collection cavity from the upstream pipe portion, and an exit opening through which drainwater exits the collection cavity and which is connectable to the downstream pipe portion, and wherein the entrance and exit openings are disposed in an elevated and spaced condition above the bottom;

a length of conduit having two opposite ends, one end of which is joined to the collection cavity-defining means about the entrance opening thereof and the other end of which is connectable to the upstream pipe portion for receiving drainwater delivered therefrom;

the length of conduit being disposed in such a relation to the circular sidewalls of the collection cavity so that drainwater which enters the collection cavity through the entrance opening thereof is directed by the length of conduit substantially tangentially along the inside surface of the sidewalls to impart a swirling motion to drainwater collected within the collection cavity of the cavity-defining means; and baffle means supported within the collection cavity of the cavity-defining means and adjacent the exit opening of the cavity-defining means for isolating the exit opening from swirling motion of the drainwater within the collection cavity of the cavity-defining means yet permit drainwater to exit the cavity-defining means through the exit opening when the level of drainwater collected within the cavity-defining means reaches the level of the exit opening.

* * * * *